May 3, 1966 J. E. LINDBERG, JR 3,248,871
METHOD AND APPARATUS FOR POWER TRANSMISSION AND ACTUATION
Original Filed Sept. 30, 1960
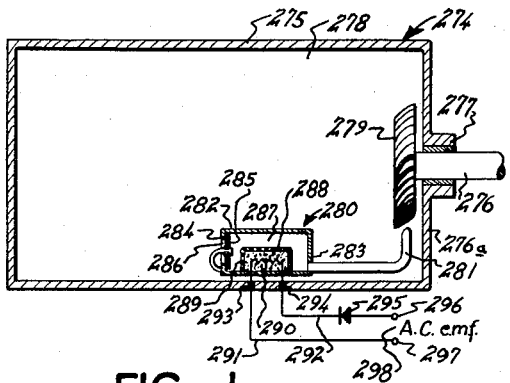
FIG. 1
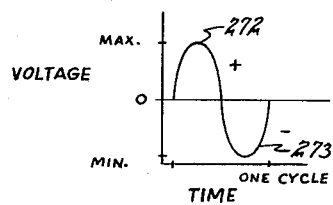
FIG. 2
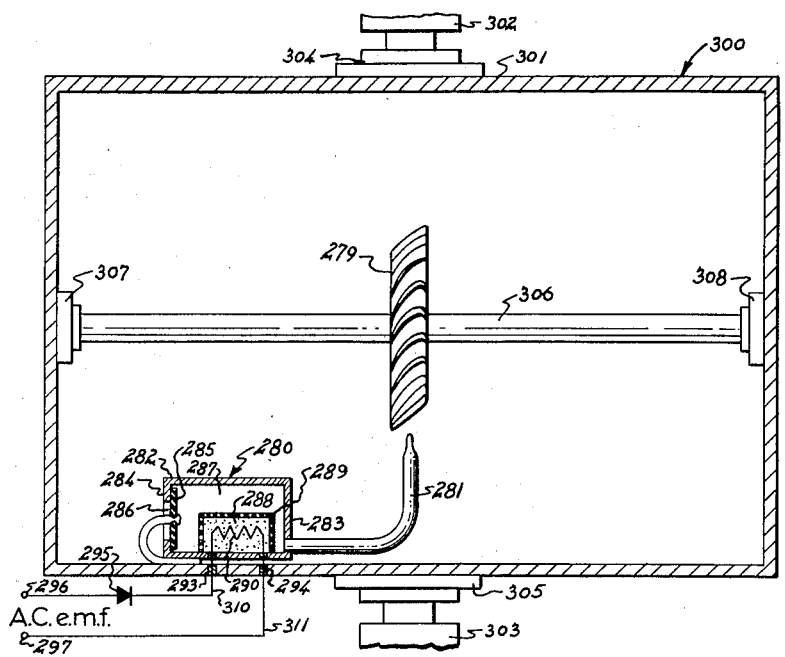
FIG. 3
INVENTOR.
JOHN E. LINDBERG, JR
BY 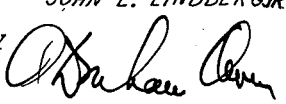
ATTORNEY United States Patent Office 3,248,871
Patented May 3, 1966

3,248,871
METHOD AND APPARATUS FOR POWER
TRANSMISSION AND ACTUATION
John E. Lindberg, Jr., 1211 Upper Happy Valley Road,
Lafayette, Calif.
Original application Sept. 30, 1960, Ser. No. 60,250.
Divided and this application June 3, 1964, Ser. No.
372,248
4 Claims. (Cl. 60—24)

This application is a division of application Serial Number 60,250, filed September 30, 1960, now abandoned which was a continuation-in-part of application Serial Number 759,717, filed September 8, 1958, now abandoned.

This invention relates to improvements in method and apparatus for power transmission and actuation. It can be used to actuate any device capable of applying mechanical force, including hydraulic systems, gas turbines, loudspeakers, valve actuators, and the like.

Conventional power transmission and actuator systems are generally bulky and excessively heavy. They are complex units, expensive to overhaul and repair. The operation of many of them depends upon liquids or gases that either have to be contained in rather large reservoirs to provide potential energy or have to be circulated by pumps. In addition, many systems require close-fitting leak-proof seals which are subject to failure at elevated temperatures. Often, special fittings, valves, and transmission lines are required as integral parts of the actuator unit.

Adequate power transmission systems are vital on modern aircraft, where they are used for retracting and lowering the landing gear, flap control, afterburner control and many other things. But the actuator systems heretofore available have proved inadequate in the high-temperature environment experienced by high-speed aircraft and by guided missiles. Consequently, major aircraft companies have been trying to develop 3000 p.s.i. actuator systems able to operate between —65° F. and 1000° F. Much current research is directed toward development of hydraulic systems capable of operating in these environments, but performance data on hydraulic pumps indicate that, as yet, no dependable pump has been developed which will function properly over the full —65° F. to 1000° F. range. Even if there were such pumps, contemporary hydraulic fluids are, at best, able to perform satisfactorily only within the range of —100° F. to 700° F., while the seals that are necessary in a hydraulic system have a relatively short life at 700° F.

Moreover, hydraulic systems have many disdvantages, even if able to function properly. A pump external to the actuating system is necessary, as are hydraulic accumulators in some cases; high pressure fittings, control valves, and transmission lines must be installed as an integral part of the system and these result in excessive bulk and weight. The fluids involved often constitute a fire hazard, and the system must be primed before operation. In addition, when replacing a defective unit because of a breakdown, other parts of the system are often affected, resulting in expensive procedures.

One object of this invention is to provide an actuator (i.e., power-transmission) system capable of satisfactory operation at both (1) elevated temperatures in the range of 1000° F. and higher and at high pressures and (2) low temperatures (e.g., —65° F.) and at lower pressures. Another object is to provide an actuator that does not depend upon liquids of any kind. It achieves these objects by utilizing certain thermodynamic properties of special classes of materials to alter the internal pressure of a container in which they are enclosed, in accordance with the temperature of the materials.

The actuating systems of this invention are simpler, more compact, and more economical to operate than conventional systems, and do not depend upon external pumps or reservoirs.

A further aim of this invention is to provide actuating systems requiring no valves, fittings, or fluid or vapor transmission lines, as do numerous present-day actuators, and requiring no priming operations.

Over and above eliminating many disadvantages of conventional actuating systems, as well as solving the problem of elevated temperature and pressure actuation, this invention presents a much smaller fire hazard than other contemporary systems, and will function with any source or sink of heat.

Other objects and advantages of the invention will appear from the following detailed description of some preferred embodiments thereof.

In the drawings:

FIG. 1 is a diagrammatic view in elevation and in section of a turbine-drive actuator embodying the principles of this invention.

FIG. 2 is a diagram of an electrical wave form (current or voltage plotted against time) that may be used in the actuators of FIGS. 1 and 3.

FIG. 3 is a diagrammatic view in elevation and in section of a turbine-driven gyroscope, embodying the principles of the invention, with the gyroscope-supporting members broken off.

GENERAL PRINCIPLES OF THE INVENTION

Metallic hydrides are capable of ingassing (taking in gas in either a chemical or physical action) or degassing (also called "outgassing"), upon the application or removal of heat. For example, certain classes of hydrides release large amounts of hydrogen solely as a result of the application of heat, while other hydrides absorb hydrogen solely because of the application of heat. Although this phenomenon has been observed for many years, about the only application of it, heretofore, has been in the electronic tube industry, where "getters" take up the residual gases remaining in the tubes after the tubes have been sealed. However, as will be seen, these ingassing or outgassing substances, hereafter termed as "gas-transfer agents," represents, under the right conditions, a very useful means for storing energy. Moreover, this energy may be converted to perform useful work whenever desired by varying the temperature or pressure conditions.

One way of utilizing this phenomenon is to enclose a gas-transfer agent of this invention in a container of variable dimensions, so constructed that the dimensions always conform to equilibrium conditions, i.e., to a balance of the internal forces against the external forces. The application of heat to such an enclosed gas-transfer agent then results in the alteration of the internal pressure within the container due to the emission of the gas from the gas-transfer agent, with the consequence that the container dimensions alter in order to maintain equilibrium. This dimensional alteration is accomplished by movement of some part of the container, and this movement can be used to "actuate" or cause movement of another device which will perform useful work.

A few devices of variable dimensions suitable for my invention will be discussed in detail below. Before considering them, however, it is desirable to inquire into the general properties of the gas-transfer agents suitable for this invention.

GAS SORPTION

There are at least three mechanisms by which gases or vapors may be taken up by a solid. (1) The solid may chemically react with the gas or vapor. (2) The solid may physically adsorb the gas; then the gas condenses as a layer on the surface of the solid. (3) The solid may physically absorb the gas; then gas enters into the interior of the solid in much the same manner as gas dissolving in a liquid. In many cases, the solid may take up gas by both adsorption and absorption, and in many cases it is difficult to determine the exact nature of the mechanisms involved; so the generic term *sorption* and its derivatives *sorptive, sorbent*, etc., are used to include both or either of absorption and adsorption. Materials differ widely with respect to their capacity for sorption or desorption. Some reactions are irreversible; that is, once a gas or vapor is sorbed (or desorbed) by some solids under the initiating circumstances, it cannot be desorbed (or re-sorbed) except under the most extreme treatment; with certain other classes of substances, sorption and desorption of a gas or vapor is reversible and can be made to occur repetitively for an unlimited number of cycles.

For every sorptive condition of a mixture of a gas or vapor and a sorbent substance, at any one temperature, there is a certain pressure at which this mixture will be in thermodynamic equilibrium. When the gas or vapor (sometimes both) is a thermodynamic phase of the sorbent substance, this pressure is often called the "equilibrium pressure"; when the gas is not necessarily native to the sorbing substance, this pressure is often called the "dissociation pressure"; however, I shall use the terms interchangeably. It is generally true that under equilibrium conditions a change in any one thermodynamic variable causes a change in the others. Thus, the equilibrium pressure may be varied by changing the temperature.

When a gas or vapor is sorbed or goes into solution in the occluding substance, heat is evolved or absorbed in the reaction, the reaction being termed exothermic if heat is evolved and endothermic if heat is absorbed. The heat evolved or absorbed is termed the "heat of solution." In an exothermic reaction, the sorbing substance may be made to give up its gas when heat is added. In an endothermic reaction, the sorbing substance may be made to occlude gas when heated.

SORPTION OF HYDROGEN BY METALS

The phenomenon of sorption of hydrogen by metals merits special consideration because, as will be explained below, many metallic hydrides contain a vast quantity of hydrogen, so that great energy is available. Furthermore, hydrogen is the most mobile of gases, so that it moves quickly to actuate quickly. The action is reversible for indefinite recycling, is rapid in both directions, and can be obtained over a wide range of temperatures by proper selection of the metal to be used. The sorption may be adsorption, absorption, or diffusion into the metal. In general, finely powdered metals take up gases to a much greater extent than solid forms of the metal, because a much greater surface area is available for interaction. For example, Table I shows an isobar for the adsorption of hydrogen by nickel powder.

*Table I*

ADSORPTION OF HYDROGEN ON NICKEL POWDER
[At a pressure of 600 mm. of mercury]

Temperature in ° C.: Solubility in cubic centimeters of gas per 100 grams of nickel
- −100 ------------------------------------ 31.5
- −50 ------------------------------------- 29.5
- 0 ---------------------------------------- 27.0
- 50 -------------------------------------- 24.5
- 100 ------------------------------------- 22.5
- 150 ------------------------------------- 20.5

Paralleling the phenomenon of physical sorption, there are numerous cases in which hydrogen reacts with metals to form compounds or solutions of the gas in the solid or liquid metal. There are several different types of interaction between hydrogen and the elements: With the elements of the main Groups IV through VII of the Periodic Chart, covalent hydrides are formed such as hydrogen sulfide, arsenic hydride, and silicon hydride. In addition, complex hydrides are also formed by boron and one or more elements chosen from the group consisting of the main groups IV through VII of the Periodic Chart. The borohydrides (whose general formula is $M_x(BH_4)_y$, where M is a metal and $x$ and $y$ are valence integers) are relatively stable liquids and solids. They are characterized by relatively small densities and wide variation in ranges of heats of formation.

With the alkali and alkaline earth metals, i.e., Groups I–$a$ and II–$a$ of the Periodic Table, hydrogen forms stoichiometric compounds such as sodium hydride and calcium hydride. These are ionic in behavior, with hydrogen as the negative ion. The reactions are reversible and exothermic and are especially useful in this invention.

Hydrogen reacts with aluminum to form aluminum hydride and complex alumino hydrides such as lithium alumino hydride, magnesium alumino hydride, and sodium alumino hydride.

With the elements of Groups I–$b$, II–$b$, VI–$a$, VII–$a$, and VIII–$a$ (except palladium), hydrogen forms true solutions as indicated by (a) the observation that the solubility varies as the square root of the pressure and (b) the increase in solubility with increase in temperature. Metals of these groups are designated as Group A metals. Table II gives representative solubility of hydrogen in some Group A metals.

*Table II*

SOLUBILITY (CM.³/100 G.) OF HYDROGEN AT 1 ATMOSPHERE PRESSURE IN TYPICAL METALS OF GROUP A

| T., ° C. | Ni | Cr | Cu |
|---|---|---|---|
| 200 | 1.70 | | |
| 400 | 3.15 | | 0.06 |
| 600 | 5.25 | 0.5 | 0.30 |
| 1,000 | 9.80 | 3.0 | 1.58 |
| 1,400 | 16.2 | | 11.8 |
| 1,500 | 41.6 | | 13.6 |
| Vg (800) | 0.69 | 0.071 | 0.066 |

Vg=cc. of hydrogen per cc. of hydride at 800° C.

With the elements of Groups III–a (including the rare earth and actinide elements), IV–a and V–a, hydrogen forms pseudo-hydrides. While the solubility of hydrogen in elements of these groups varies as the square root of the pressure, it decreases with increase in temperature. Above about 300° C., palladium also behaves this way. Elements of these groups are designated as Group B. Table III illustrates the sorption of hydrogen in selected Group B metals.

*Table III*

SORPTION OF HYDROGEN BY TYPICAL METALS OF GROUP B

[In cm.³ (S.T.P.) per gram, at 1 atm.]

| T., ° C. | Ti | V | Zr | Th |
|---|---|---|---|---|
| 20 | 407.4 | 150 | 235.5 | 148 |
| 400 | 387.7 | 38 | | |
| 600 | 334.7 | 10 | 184 | 91 |
| 800 | 140.9 | 4.4 | 165 | 81 |
| 1,000 | 66.1 | 2.5 | 78 | 26 |
| d | 4.52 | 5.87 | 6.4 | 11.2 |
| Vg | 1,800 | 900 | 1,525 | 1,660 |

Vg=cc. of H² per cc. hydride at 20° C.
d=density of the metal.

Although the reactions in both Group A and Group B are perfectly reversible, a very desirable property in itself, the solubilities of hydrogen in Group B metals are about 1000 to 10,000 times those of hydrogen in Group A metals, as may be seen from Tables II and III. The solubility in both groups varies with the square root of the pressure, but in Group B the solubility decreases with rise in temperature and the reaction is exothermic, while in Group A the solubility increases with rise in temperature and the reaction is endothermic. Thus, if a sample of titanium hydride, which has been fully ingassed at room temperature, is heated at one atmosphere pressure to 1000° C., an amount of hydrogen equivalent to 341 cc. of hydrogen per gram of hydride at standard temperature and pressure will be given up by the sample. Theoretical relationships for the solubility of hydrogen as a function of pressure and temperature, derived by the methods of statistical mechanics, have been deducted by Fowler and Smithells.

For metals of Group A, the solubility S is given by the equation, $$S = \frac{16.2 \times 10^3 \sqrt{P_{atm}}}{T^{1/4} d} e\left(-\frac{Q}{1.98T}\right) \quad \text{(Equation 1)}$$

where $S$=solubility reckoned at standard temperature and pressure,
$P_{atm}$=pressure in atmospheres,
$Q$=heat of solution in calories per mole of $H_2$,
$T$=temperature in degrees Kelvin,
$d$=density of the metal.

For metals of Group B:

$$\frac{S}{S_o - S} = \frac{48.2 \sqrt{P_{atm}}}{T^{1.75}} e \frac{Q}{1.98T} \quad \text{(Equation 2)}$$

where $S_o$=solubility at saturation at room temperature and the other symbols have the same meaning as in Equation 1.

The values of Q to be used for metals of Group B may be found from Table IV. The calculated values of S are found to be about plus or minus 10% those observed; that is, the values listed in Tables II and III.

*Table IV*

| Metal | | Q cal./mole $H_2$ |
|---|---|---|
| Ti | 10,000 | For T<600° C. use 15,000. |
| Zr | 17,500 | |
| Th | 22,500 | For T<800° C. use 18,600. |
| V | 7,700 | For T<350° C. use 9,100. |

SPECIAL ADVANTAGES OF METALLIC HYDRIDES

While the other solids absorb gases and while there are other ways of obtaining pressure increases with temperatures, metallic hydrides possess some important special advantages. The vaporization of liquids and the pressure increases of gases due to temperature increases have been used in actuators, but they require special treatments and have many known disadvantages, some of which already have been commented on. As to the other solids, they tend to be restricted in usefulness, low in power output, slow to act, and tend to lose their ability to perform repeatedly.

The metallic hydrides are very quick to respond—one actuator I have built has actuated and de-actuated at sixty cycles per second. Many hydrides contain vast volumes of hydrogen—some have over 1700 times the volume of the metal hydride. The reaction is not only reversible; it is capable of indefinite recycling, thousands or hundreds of thousands of times. The hydrides can be used to actuate at very high temperatures, and in an environment where the pressure is very high, where, again, conventional actuators are useless.

GENERAL APPLICATION OF GAS-TRANSFER AGENTS TO THE PROBLEM OF ACTUATION

My invention provides means for altering the internal pressure of any closed container. If the container has dimensions which are variable with internal pressure, then the resultant change of volume due to change in internal pressure can be utilized to activate a suitable device. The container of variable dimensions used in this manner thus becomes an actuator.

There are, as previously explained, many hydrides, and their equilibrium gas or vapor content varies with temperature and pressure. In general, the equilibrium pressure and temperature have a one-to-one correspondence. Hence, by inserting an ingassed or degassed gas-transfer agent within a closed container, the internal pressure of the unit may be varied by the simple expedient of heating or cooling the gas-transfer agent.

An analytical expression has been developed for the purpose of calculating the change in volume of a container of variable dimensions resulting from changing the temperature of a specified amount of enclosed gas-transfer agent. The internal volume of the container is conveniently referred to as the "loading chamber." The equation, which may be referred to as "the loading-chamber equation" or "Equation 3" is:

$$\Delta V = \left[d \Delta S_{P,T} + 1 - \frac{P_o T}{P T_o}\right] V_h - V_o 1 - \frac{P_o T}{P T_o}$$

(Equation 3)

where $d$ is the density of unsaturated gas-transfer agent, in grams per cc.
$P_O$ is the initial pressure of the loading chamber in atmospheres
$T_O$ is the initial temperature of the loading chamber, in ° Kelvin
$P$ is the final pressure of the loading chamber, in atmospheres
$T$ is the final temperature of the loading chamber, in ° Kelvin
$\Delta S_{P,T}$ is the change in gas or vapor content of the gas-transfer agent, in cc., when pressure and temperature are varied from $P_O$, $T_O$ to $P$, $T$
$V_O$ is the initial volume, in cc., of the loading chamber at pressure $P_O$ and temperature $T_O$
$V_h$ is the volume, in cc., of the gas-transfer agent in the loading chamber
$V$ is the volume, in cc., of the loading chamber at pressure $P$ and temperature $T$
$\Delta V$ is $V - V_O$, which is the change in volume of the loading chamber, in cc.

It is understood that initially the gas-transfer agent in the loading chamber is surrounded by, and is in equilibrium with, either an inert gas or vapor, or with a gas or a vapor of the same chemical composition as that contained in, or to be released by, the gas-transfer agent. Helium, argon, xenon, and neon are typical suitable inert gases.

The hydrides of Group B are highly superior gas-transfer agents, since their solubilities are rather large, and the reactions are reversible, which means that volume changes can be effected by varying the pressure and temperature in either direction. The equation for the solubility of hydrogen in metals of Group B has been given above; the reaction is exothermic. From the previously given Equation 2, the following equation for $\Delta S_{T,P}$ may be obtained:

$$\Delta S_{T,P} = \frac{3.66 \times 10^{-3} T S_o}{P\left[1 + \frac{48.2 P}{T^{1.75}} e \frac{Q}{1.98T}\right]}$$

(Equation 4)

where $P$ and $T$ are in the same units as in the loading-chamber equation.

Several values of $\Delta V$ based on the hydrides of Group B calculated from the preceding equations for a series of temperatures and pressures are listed in Table V for a few hydrides.

Table V

| Hydride | $P_o$ atm. | $T_o$ °C. | P atm. | T °C. | V |
| --- | --- | --- | --- | --- | --- |
| V | 1 | 20 | 5.1 | 200 | $37.2 V_h - 0.7 V_o$ |
| Zr | 1 | 20 | 204 | 600 | $1.11 V_h - 0.98 V_o$ |
| Ti | 1 | 20 | 204 | 1,000 | $38 V_h - 0.98 V_o$ |
| Ti | 1 | 20 | 2,500 | 2,000 | $6.9 V_h - V_o$ |
| Zr | 10 | 100 | 204 | 1,000 | $10.4 V_h - 0.8 V_o$ |
| Ti | 50 | 200 | 204 | 1,000 | $37.5 V_h - 0.34 V_o$ |
| V | 1 | −30 | 10 | 0 | $0.89 V_h - 0.88 V_o$ |

It can be seen from Table V that large pressures are capable of being developed in a chamber at elevated temperatures. This statement has been verified by me in my laboratories where I observed that upon heating 2.37 grams of zirconium hydride enclosed in a volume of 5 cm.$^3$ with an initial pressure of 1 atm., an internal pressure of 1200 p.s.i.g. was developed. Some of these regions of pressure and temperatures are well above those required for aircraft actuation.

One of the unique features possessed by my invention is the fact that the rate of ingassing of many hydrides is enhanced by increasing the initial equilibrium pressure $P_O$ surrounding the hydride. In fact, the rate of ingassing increases linearly with pressure over a very wide range. The usefulness of this phenomenon lies in the fact that cyclic rates of ingassing and degassing may be varied effectively by varying the initial internal equilibrium pressure. One of the inert gases, previously referred to, may be chosen to perform this function. The inert gases possess an important advantage over hydrogen in that, with many materials, the diffusion rate of the inert gases is negligibly small in comparison with hydrogen. This means that, in a hydride employed as a gas-transfer agent within the loading chamber, the replacement of some of the hydrogen with an inert gas within the chamber will reduce effectively the chance of loss of hydrogen by diffusion through the material. Application of this fact may be made to several of the applications of my invention which will shortly be discussed in detail.

A GETTER OPERATED TURBINE (FIG. 1)

FIG. 1 shows a getter-operated turbine assembly 274. The assembly 274 includes a main housing 275 constructed of nonporous material such as metal. A driveshaft 273 extends out from one end 276a of the housing 275, through a seal 277. The shaft 276 may rotate in the seal 277, while the interior 278 of the housing 275 is sealed from the external atmosphere.

A turbine rotor 279 is securely attached to the driveshaft 276 at the end that terminates in the housing interior 278. Along one side or in some other convenient location within the housing 275 is located a gas generating unit 280, comprising a flow nozzle 281 so oriented that gas escaping from the nozzle 281 impinges upon the blades of the turbine rotor 279 and causes it to rotate. The resulting rotation of the shaft 276 may then be applied to produce useful work upon any suitable device connected to the shaft 276 outside the housing 275. The remaining portion of the gas generating unit 280 may comprise a non-porous container 282 to which the nozzle 281 is attached at one end 283. At the other end 284 of the container 282, a pressure-operated diaphragm 285 is placed over an opening 286. Gas may flow from the housing interior 278 under pressure into an interior region 287 of the gas generating container 280, but gas may not flow in the opposite direction through the hole 286 covered by the diaphragm 285.

In the interior of the gas-generating container 280, a suitable amount of a suitable gas-transfer agent 288 is retained within a porous structure 289, which may be of porous ceramic designed to prevent particles of the agent 288 from escaping while the gas generated by the agent 288 can flow freely into the region 287 of the gas generating unit 280. A heater coil 290 is embedded in the gas-transfer agent 287, and its leads 291, 292 are brought out of the main housing 275 through hermetic seals 293, 294. One lead 292 passes through a rectifier 295 and thence to a terminal 296 while the other lead 291 passes directly to a terminal 297. A pulsating or alternating generator of current 298 is connected across terminals 296 and 297. An example of a suitable current wave form from the current generator is shown in FIG. 2. Prior to final sealing of the main housing 275, all gas is removed and gas native to the gas-transfer agent 288 is forced in to ingas the agent 288. The housing 275 is then sealed to prevent the entrance or exit of gas to or from its interior 278.

In operation, current 298, whose wave form may be of the type shown in FIG. 2, is applied to the terminals 296 and 297. The rectifier 295 passes only one portion of the wave form, say the top portion 272 labeled "+" in FIG. 2, to the heater coil 290. Heat generated by the heating coil 290 causes the gas-transfer agent 288 to release hydrogen gas through the porous container 289 into the region 287 of the gas generating unit 280, with the consequence that pressure rises in this region, because the diaphrgam 285 prevents the flow of gas out the opening 286. However, gas may flow into the interior 278 through the nozzle 281, which is directed onto the turbine rotor 279. Thus a stream of gas impinges upon the rotor 279 and causes it to rotate.

This process continues until the pressures in the regions 278 and 287 are nearly equalized. Meanwhile, the alternating current has reversed sign and the rectifier 295 prevents the negative pulse 273 from flowing to the heater coil 290. As a result, the coil 290 cools during this portion of the cycle; so the gas-transfer agent 288 cools and takes in gas. Therefore, the pressure in the region 287 is lowered below that of the region 278, and gas from the region 278 is forced through the diaphragm 285 into the region 287, where it is absorbed by the gas-transfer agent 288. During this portion of the cycle, gas does not impinge upon the rotor 279; however, the rotor 279 may be so designed as to incorporate enough inertia to continue its rotation during the ingas portion of the cycle. When alternating current 298 again reverses, a positive pulse 272 is again applied to the terminals 296 and 297, and the cycle is repeated as described previously.

A GYROSCOPIC DRIVE

A turbine drive may be completely enclosed if desired. For example, FIG. 3 shows an apparatus for driving a gyroscope 300. A non-porous gyroscope housing 301 is pivoted on mounting shafts 302 and 303 by means of bearings 304 and 305 attached to the exterior of the housing 301. The gyroscope rotor comprises a turbine wheel 279 (like that of FIG. 1) fixed on a rotor shaft 306. The shaft 306 is free to rotate in the bearings 307 and 308, which are mounted to the interior of the housing 301. The axis of the rotor shaft 306 is perpendicular to the axis of the mounting-shafts 302 and 303, so that the gyroscope 300 has, in this instance, two degrees of freedom.

The turbine 279 is driven by a gas generating unit 280 mounted at a convenient location on the inside wall of the housing 301. The construction and operation of the unit 280 is the same as in FIG. 1, except that in FIG. 3 the conductors 310 and 311 are flexible and are long enough so they will not constrain the motion of the gyroscope 300. The theory and operation of gyroscopes is well known and will not be presented here, and it suffices to say that the action of the gyroscope may be to exert a stabilizing torque on the mounting shafts 302 and 303, which are connected to the body (not shown) whose motion it is desired to control. This form of the invention demonstrates that the turbine 279, the shaft 306, and the gas generator 280 may function entirely inside of a sealed housing 301. This permits operation in a very pure or clean atmosphere, such as pure hydrogen. Although this example has employed a gyroscope with two degrees of freedom, the extension of its application to three degrees of freedom is obvious and does not depart from the spirit and the scope of the invention.

EFFECT OF OUTGASSING ON ELECTRICAL PROPERTIES OF THE HYDRIDE

For many applications it will be satisfactory for the hydride to be in direct contact with the filament, especially when low filament voltages and temperatures are employed. However, at high voltages and/or temperatures, shorts across the filament may occur. This is a result of a property of hydrides in general, namely, a change in electrical resistance when the gas content changes. For example, the resistance of titanium or zirconium hydride decreases as their hydrogen content decreases, so that filament temperatures that cause the hydride to outgas also lower its resistance to the point where an additional increase in current due to lowered resistance may generate undesired heat and cause serious electrical or mechanical leaking or may permanently damage or alter the operating characteristics of the system. Lowering pressures (at a given temperature) also result in outgassing the hydride and changing its resistance.

INTIMATELY MIXING THE HYDRIDE WITH AN INSULATOR

One way of solving the problem just stated is to electrically insulate the hydride particles at all times, without inhibiting the passage of gas to or from the hydride. A unique way of accomplishing this is to intimately mix the hydride with a powdered insulating material such as microscopic alumina or quartz. In the construction of test units it was determined that ball-milling a mix of microscopic alumina and titanium hydride in equal parts by weight for several days produced very satisfactory results. Test assemblies employing filaments of 0.002″ diameter tungsten wire embedded in this mix have periodically withstood high filament voltages and high current (e.g., 45 volts, 4 amps, at 15 p.s.i.g., cycling from room temperatures to 3000° F.) for periods in excess of one-half hour without mechanical or electrical failure or noticeable change in operating characteristics.

Additional advantages derived from the use of the hydride-insulator mix are that much less filament current is required to cause a given amount of gaseous emission than is necessary when unprepared hydride is used, indicating an increase in the energy transfer efficiency.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:
1. An actuator, comprising a closed and sealed container; a turbine mounted rotatably inside said container; metallic hydride in said container, the metallic hydride releasing hydrogen gas when heated and recapturing said gas when cooled; means to heat said metallic hydride; and means to direct said released gas in a stream against said turbine to cause rotation thereof.
2. The actuator of claim 1 wherein said turbine has a shaft extending outside said container, as a power take-off means.
3. The actuator of claim 1 wherein said turbine has a shaft supported in said container and wherein said container is rotatably supported on a support means, so that said actuator can function as a gyroscope.
4. In an actuator device, the combination of powdered metallic hydride mixed with powdered insulating material and an electrical heating filament embedded in said mixture.

References Cited by the Examiner
UNITED STATES PATENTS

| | | | |
|---|---|---|---|
| 1,159,893 | 11/1915 | Browne et al. | |
| 1,700,675 | 1/1929 | Goddard | 60—26 X |
| 2,187,124 | 1/1940 | Harmon | 60—25 X |
| 2,395,447 | 2/1946 | Braddon | 74—572 X |
| 2,405,121 | 8/1946 | Fehr. | |
| 2,627,911 | 2/1953 | McCarty et al. | 60—25 X |
| 2,781,784 | 2/1957 | Baker. | |
| 2,928,233 | 3/1960 | Kimm | 60—23 |
| 3,064,245 | 11/1962 | Lindberg. | |
| 3,122,728 | 2/1964 | Lindberg | 60—23 X |

OTHER REFERENCES

Johnson, Howard C. E., Metals Plus Hydrogen in Scientific American, volume 176, No. 3, pages 116–118, March 1947.

Hydrides, Report of the New England Association of Chemistry Teachers, October 1958, pages 577–582.

SAMUEL LEVINE, *Primary Examiner.*

EDGAR W. GEOGHEGAN, JULIUS E. WEST,
*Examiners.*